(12) United States Patent
Tada et al.

(10) Patent No.: US 6,379,776 B1
(45) Date of Patent: Apr. 30, 2002

(54) NONFOGGING AND STAINPROOF GLASS ARTICLES

(75) Inventors: Hiroaki Tada; Koji Shimoda; Akihiko Hattori, all of Hyogo-ken; Kazuhiro Doushita; Takashi Sunada, both of Osaka-fu, all of (JP)

(73) Assignees: Nippon Sheet Glass Co., Ltd., Osaka-fu; NSG Techno-Research Co., Ltd., Hyogo-ken, both of (JP)

( * ) Notice: Subject to any disclaimer, the term of this patent is extended or adjusted under 35 U.S.C. 154(b) by 0 days.

(21) Appl. No.: 09/125,406

(22) PCT Filed: Dec. 18, 1997

(86) PCT No.: PCT/JP97/04672

§ 371 Date: Jul. 16, 1999

§ 102(e) Date: Jul. 16, 1999

(87) PCT Pub. No.: WO98/27021

PCT Pub. Date: Jun. 25, 1998

(30) Foreign Application Priority Data

Dec. 18, 1996 (JP) .............................. 8-337969
Dec. 11, 1997 (JP) .............................. 9-340904

(51) Int. Cl.$^7$ ................................ D06N 7/04
(52) U.S. Cl. .................. 428/149; 428/325; 428/432; 428/447; 428/429
(58) Field of Search ................ 428/325, 142, 428/149, 432, 428, 447, 429

(56) References Cited

U.S. PATENT DOCUMENTS

| 6,071,623 | A | * | 6/2000 | Sugawara et al. |
| 6,074,981 | A | * | 6/2000 | Tada et al. |
| 6,103,363 | A | * | 8/2000 | Boire et al. |
| 6,156,409 | A | * | 12/2000 | Doushita et al. |

* cited by examiner

*Primary Examiner*—Deborah Jones
*Assistant Examiner*—Wendy Boss
(74) *Attorney, Agent, or Firm*—David G. Conlin; Lisa S. Hazzard; Dike, Bronstein, Roberts & Cushman Intellectual Property Practice Group

(57) ABSTRACT

The present invention relates to An anti-fogging and stain-prevented glass article having an alkali shut-off film and a photocatalytic film in the order laminated on the surface of glass substrate, in which dents and projections having an arithmetical mean roughness (Ra) from 1.5 to 80 nm and mean interval (Sm) of dents and projections from 4 to 300 nm are formed thereon, and to An anti-fogging and stain-prevented glass article having an alkali shut-off film, a photocatalytic film, and a silicon oxide monocomponent equivalent layer or a layer of organosilane including at least one kind of functional group selected from polyalkyleneoxide group, alkyl group, alkenyl group and aryl group in its molecules or its hydrolyzed substance, laminated in the order on the surface of a glass article. The abovementioned anti-fogging and stain-prevented glass article can be used for window glasses of automobiles and buildings, and glasses, etc.

14 Claims, No Drawings

NONFOGGING AND STAINPROOF GLASS ARTICLES

FIELD OF THE INVENTION

The present invention relates to an anti-fogging and stain-prevented glass article, and in particular relates to an anti-fogging and stain-prevented sheet glass for buildings, and an anti-fogging and stain-prevented glass article used for glasses, mirrors, lenses, showcases, etc.

BACKGROUND OF THE INVENTION

There has been a strong need for anti-fogging and stain-prevented glass plate mainly in the fields of automobiles and buildings since ever. In particular, as regards automobiles, it becomes an important theme to give anti-fogging and stain preventing properties to window glass in view of safe driving.

Conventionally, various kinds of anti-fogging and stain preventing coatings have been studied with respect to glass articles. For example, there are organic or inorganic thin film coating containing a surface-active agent (Japanese Laid-open Patent Publication No. 117202 of 1995, Method 1), hydrophilic polymer coating (Japanese Patent Publication No. 1344292, Method 2) and organic/inorganic composite film coating containing a hydrophilic organic functional group (Japanese Laid-Open Patent Publication No. 220428-1994, Method 3), etc.

Recently, anti-fogging and stain-prevented glass having a titanium oxide thin film, which acts as an photocatalytic film, coated on its surface has been proposed (For example, "Ceramics" 31, 837–840 (1996), published by Japan Ceramics Association Inc., Method 4). This utilizes that titanium oxide on the surface of glass absorbs ultra violet light, and the absorbed ultra violet light energy efficiently oxidizes and decomposes organic articles adsorbed on the glass surface, thereby causing a clean surface having a remarkably hydrophilicity to be obtained.

Furthermore, the anti-fogging and stain-prevented glass having the abovementioned titanium oxide thin film coated on its glass surface is composed of inorganic substances and is excellent in the mechanism strength, wherein as far as light is given thereto once stains are adhered thereto, the surface can be purified again to cause a hydrophilic surface to be restored. If the surface sustains hydrophilicity, city type lipophilic black stains are hardly adhered, and furthermore if adhered stains are easily eliminated by precipitation of rain (For example, "Painting Technique" published by Riko Publishing Co., Ltd., January, 1995, 94–99(1995), "Novel stain fogging type paint" prepared by Toshiki Komatsusawa and Toshikazu Nakaiye; "Painting Technique" 1996, October Special Issue, 95–102 (1995), "Contamination deterioration and Contamination-resisting painting technique" (Industrial Paint) prepared by Shoichi Tanaka). That is, the surface sustaining hydrophilicity has a self-cleaning property and such glass materials can be used as a stain preventing material.

Although the abovementioned method 1 is excellent in the initial performance, there is such a problem where the service life is short since the surface-active agent is gradually consumed. Furthermore, the abovementioned method 2 can not be applicable to glass for which a comparatively mechanical strength is required for automobiles and buildings although the same is an effective means in some cases. Furthermore, although method 3 is devised in order to meet the anti-fogging property and mechanical strength at the same time, the same has a limitation in both aspects. Still furthermore, in a case where stains are once adhered, there is such a problem where the anti-fogging property is remarkably lowered. Furthermore, although method 4 has in principle some features which can not be achieved by the other methods, with this method, anti-fogging and stain-prevented glass articles which can be used in practical aspects can not be achieved yet since the intensity of ultraviolet light in automobiles and buildings is very weak.

It is therefore an object of the invention to provide an anti-fogging and stain-prevented glass article, having excellent long-term anti-fogging and stain preventing properties, which can be used for window glass of automobiles and buildings, and for glasses.

DISCLOSURE OF THE INVENTION

The present invention provides an anti-fogging and stain-prevented glass article in which an alkali shut-off film and an photocatalytic film are laminated on the surface of glass substrate in the order, wherein the glass article has dents and projections, the arithmetical mean roughness (Ra) of which is 1.5 to 80 nm, and the mean interval (Sm) of which is 4 to 300 nm, formed on the photocatalytic film surface.

The invention provides an anti-fogging and stain-prevented glass article in which an alkali shut-off film, an photocatalytic film, and silicon oxide layer or an organic substance adhering preventing layer consisting of a layer of organosilane or its hydrolyzed substance having at least one functional group selected from groups consisting of poly-alkylene oxide group, alkyl group, alkenyl group and aryl group in its molecule are laminated on its glass article in the order.

It is necessary to meet the three requirements at the same time in order to obtain excellent anti-fogging and stain preventing properties using an photocatalytic film; the first of which is to efficiently oxidize and decompose organic substances which will be cause of fogs and stains adsorbed on the surface of an photocatalytic film (that is, high photocatalytic activation), the second of which is that organic substances are hardly adsorbed on the surface (adsorption preventing property), and third of which is to reduce the apparent contact angle when water drops are adhered although necessary to secure an anti-fogging property (small contact angle). If the abovementioned three requirements are satisfied, it is possible to achieve excellent anti-fogging and stain preventing properties for a longer period of time.

In the invention, $TiO_2$, $ZnO$, $ZnS$, $WO_3$, $Fe_2O_3$, $GaAs$, $CdSe$, $GaAsP$, $Cds$, $SrTiO_3$, $GaP$, $In_2O_3$ or $MoO_3$, etc. may be used as a photocatalyst. $TiO_2$ is photocatalyst which is most widely utilized at present in view of high photocatalytic activation and chemical stability, which can be favorably used in the invention. Hereinafter, a description is given of titanium oxide as a representative example.

Even though an photocatalytic film such as titanium oxide film is directly coated on the surface of glass substrate, high photocatalytic activation can not be obtained. This is because alkali metal ions such as Na ions, which come out from and are diffused from the glass substrate containing alkali metal in heat treatment, lowers the crystalization of the titanium oxide film. In order to prevent the crystalization of the titanium oxide film from being lowered, in the invention, a silicon oxide film or other alkali shut-off film is provided on the glass subtrate, and an photocatalytic film consisting of titanium oxide or an photocatalytic film containing titanium oxide is coated thereon. In a case where a film containing titanium oxide as an photocatalytic film is used, it is preferable that the content of titanium oxide is 10 or more percent by weight. If the content of titanium oxide is less than 10 percent by weight, the photocatalytic activation on the surface is lowered too much and this is not practical.

An anti-fogging and stain-prevented glass according to the invention has excellent anti-fogging and stain preventing properties and their sustainability and is excellent in mechanical strength, the same can be favorably used for automobiles, buildings and glasses.

Hereinafter, a description is given of the respective components of the invention.

[Alkali shut-off film]

As the abovementioned alkali shut-off film, a monocomponent or multicomponent composition selected from a group of silica oxide, aluminium oxide, titanium oxide, zirconium oxide and cerium oxide may be preferably used. Of them, a monocomponent of silica oxide or a multicomponent having silica oxide as its main component is preferable, and a two-component metal oxide consisting of silica oxide and zirconium oxide is further preferable. Since a metal oxide having silica oxide as its main component has a low refractive index and does not greatly spoil the photocatalytic characteristics of glass plate, it is preferable in view of formation of film. As regards a two-component metal oxide consisting of silica oxide and zirconium oxide, since its alkali shut-off property is very high, the same is further preferable, wherein a two-component metal oxide having the content of zirconium oxide at a ratio from 1 or more percent by weight to 30 or less percent by weight is most preferable. If the content of zirconium oxide is less than 1 percent by weight, there is no difference in the effect of improvement of the alkali shut-off property between zirconium oxide and monocomponent silica oxide. If the content thereof is 30 or more percent by weight, no more effect of improvement of the alkali shut-off property can be expected, and the reflection ratio is likely to be increased due to an increase of the refractive index. In this case, it becomes difficult to control the photocatalytic characteristics of glass plate, and this is not preferable.

It is preferable that the thickness of the abovementioned alkali shut-off film is from 10 nm or more to 300 nm or less. If the thickness if less than 10 nm, the alkali shut-off effect is not sufficient., and if the thickness is more than 300 nm, the interference color can be recognized to be remarkable, wherein it will become difficult to control the photocatalytic characteristics, and this is not preferable.

The abovementioned alkali shut-off film can be formed by an already-known method. For example, there are a sol-gel method (for example, Ceramics Association Journal, 90, P. 328 to 333 (1982) prepared by Yuji Yamamoto, Kanichi Kamiya, and Sumio Tsukuribana), a liquid-phase deposition method (for example, Japanese Patent Publication No. 59210/1989, and Japanese Patent Publication No. 13301/1992), a vacuum film formation method (vacuum evaporation, spattering), a baking method or spray coat (for example, Japanese Laid-open Patent Publication Nos. 124523/1978 and 96749/1981), a CVD method (for example, Japanese Laid-open Patent Publication Nos. 90441/1980, 201046/1989, and 208849/1993), etc.

[Photocatalytic film]

The photocatalytic activation of an photocatalytic film coated on the abovementioned alkali shut-off film greatly depends on the film thickness. If the film thickness is too thin, the optical catalyst film does not sufficiently absorb light, and if it is too thick, photocatalytic carriers produced in the film can not be sufficiently diffused outside the film. In either case, the catalyst activation is lowered. Although the most adequate film thickness differ according to the use condition, it is preferable that the film thickness is in a range from 10 nm to 500 nm, more preferably from 40 to 200 nm, in which a good photocatalytic activation can be achieved.

Although an photocatalytic film consisting of titanium oxide or an photocatalytic film containing titanium oxide of the invention is produced by using a usual film formation method, the sol-gel method is most preferably used. Sol can be obtained by hydrolyzing titanium alkoxide or titanium alkoxide along with other metal alkoxide at the same time. It is simple that a liquid available on the market, in which titanium oxide fine particles are dispersed in an inorganic binder (containing other metal alkoxide than titanium), and this is preferable used. As one of the examples of liquids which are available on the market, "ST-K03" produced by Ishihara Industries Co., Ltd., and containing titanium oxide at a ratio of 5 percent by weight and inorganic binder at a ratio of 5 percent by weight), "CA-62" produced by Taki Chemical Co., Ltd, and containing titanium oxide at a ratio of 6 percent by weight and inorganic binder at a ratio of 1.5 percent by weight), etc. may be listed.

After a titanium oxide based thin film is formed on the alkali shut-off film, it is preferable that heat treatment is carried out at 450 to 650° C. for ten minutes to two hours in order to improve the densification and crystalization of titanium oxide.

[Fluorine dope onto the photocatalytic film]

By doping a bit of fluorine atoms in the abovementioned photocatalytic film, there is a possibility that the photocatalytic activation is increased. Trifluoroacetate, etc. may be used as a dopant. A dopant such as trifluoroacetate, etc. is decomposed by subsequent heat treatment, and is doped into titanium oxide crystal grating as fluorine in a state of atom. Since the size of fluorine atoms is almost the same as that of oxygen atoms, it is considered that the doped fluorine atoms mainly exist in a form in which they are displaced by oxygen atoms of titanium oxide.

In a case where a titanium oxide based photocatalytic film is formed by a sol-gel method, fluorine atoms are doped into the film at a ratio of 0.002 to 1 percent by weight after the heat treatment such as burning is completed by adding a thermally decomposable fluorine compound such as trifluoroacetate (TFA) to a solution of titania-alkoxide which is the material thereof, or to a liquid in which titanium oxide fine particles are dispersed, and it is possible to increase the photocatalytic film activation.

Furthermore, in a case where a titanium oxide photocatalytic film is formed by a vacuum evaporation method or a chemical gas-phase deposition (CVD) method, it is possible to dope fluorine atoms by adding a fluorine compound to the material as in the above description.

If the amount of dope of fluorine atoms in the film is less than 0.002 percent by weight, the effect of increase of photocatalytic activation is not remarkable, and if the amount is more than 1 percent by weight, the photocatalytic activation is no more expected.

On the other hand, even by doping fluorine atoms into an alkali shut-off film, the fluorine atoms are diffused in a titanium oxide based film by heat treatment, wherein similar effects can be obtained. It is preferable that the amount of dope of fluorine atoms in the alkali shut-off film is from 0.002 or more percent by weight to 10 or less percent by weight. If the amount of dope of fluorine atoms in the alkali shut-off film is less than 0.002 percent by weight, an increase of the effect of photocatalytic activation of the photocatalytic layer is not remarkable, and if the amount thereof is more than 10 percent by weight, no more increase of the effect of the photocatalytic activation of the photocatalytic layer can be expected.

Doping of fluorine atoms into an alkali shut-off film is usually carried out by a method of adding a fluorine compound into the material thereof when forming an alkali shut-off film by a sol-gel method, a vacuum evaporation method, a baking method, a spray coat method, a CVD method, etc. Furthermore, in a case where an alkali shut-off film of silica is formed by a liquid-phase deposition method, since fluorine is included in the material solution (silica super saturation solution of silicofluoride hydroxide) at a ratio of 0.1 to 10 percent, it is not necessary to specially add fluorine to the material solution, the material solution can be used as it is.

[Dents and projections on the photocatalytic film surface]

In the present invention, dents and projections having an arithmetical mean roughness (Ra) from 1.5 to 80 nm and mean interval (Sm) from 4 to 300 nm therebetween are formed on the surface of an photocatalytic film which is coated on the abovementioned alkali shut-off film. Thereby, the contact angle with respect to water is made smaller, and more excellent anti-fogging property and long-term sustainability can be obtained.

In a case where the abovementioned Ra value is less than 1.5 nm or more than 80 nm, the long-term stability of the anti-fogging performance is low and is not preferable. Furthermore, the Sm value is less than 4 nm or more than 300 nm, the long-term stability of the anti-fogging performance is low and is not preferable. It is further preferable that the dents and projections have an arithmetical mean roughness (Ra) from 5 to 30 nm and mean interval (Sm) from 5 to 150 nm therebetween. In this range, the long-term stability of the anti-fogging performance is further preferable. Herein, Ra value and Sm value are defined by a method regulated in Japanese Industrial Standards JIS B 0601 (1994), and they can be calculated on the basis of section curves observed and measured by an atomic force microscope (for example, Seiko Electronic Co., Ltd., Type SPI3700) and an electron microscope (for example, Hitachi, Limited, Type H-600).

Dents and projections on the surface of photocatalytic film can be produced by a method of laminating a thin photocatalytic film on the glass substrate surface so as not to spoil the dents and projections after an alkali shut-off film having dent and projection surface is formed, or a method of directly denting and projecting the photocatalytic film itself.

[Dent and projection alkali shut-off film]

In a case where the surface of titanium oxide based photocatalytic film is dented and projected by forming an alkali shut-off film having a dent and projection surface, the alkali shut-off film can be preferably formed by a sol-gel method or a liquid-phase deposition method.

The dent and projection alkali shut-off film by a sol-gel method is formed by coating a coating liquid containing metal oxide fine particles, and hydrolyzable, condensable and polymerizable organometallic compound or containing chlorosilyl group contained compound or their hydrolyzed substances onto a glass article, drying and as necessary thermally treating the same.

As the abovementioned metal oxide fine particles, a metal oxide fine particles of a monocomponent selected from a group consisting of silicon oxide (silica), aluminium oxide (alumina), zirconium oxide (zirconia), titanium oxide (titania), cerium oxide (ceria), or a complex metal oxide fine particle consisting of metal oxide fine particles, mixtures thereof, and two or more constituents thereof may be used. These are preferably used in a form of solvent diffusion sol (colloid solution). The following are available as a metal oxide sol; for example, "Snowtex-OL", "Snowtex-O", "Snowtex-OUP", "Snowtex-UP", which are silica sols made by Nissan Chemical Industries, Ltd., "Alumina sol 520" which is an alumina sol made by Nissan Chemical Industries, Ltd., "Zirconia sol NZS-30A" which is a zirconia sol made by Nissan Chemical Industries, Ltd., "Titania sol CS-N" which is a titania sol made by Ishihara Industries CO., Ltd., "Needlar U-15" which is a ceria sol made by Taki Chemical Co., Ltd., etc. All of which are water dispersion sols available on the market, and "IPA-ST" and "XBA-ST" made by Nissan Chemical Industries, Ltd, which are an organic solvent dispersion silica sol available on the market may be listed.

It is preferable that the grain size of the abovementioned metal oxide fine particles is from 4 through 300 nm. If the grain size of metal oxide fine particles is less than 4 nm, the arithmetic mean roughness (Ra) is liable to become less than 1.5 nm and the mean interval (Sm) of dents and projections is liable to become less than 4 nm, no effective dent and projection to improve the anti-fogging capacity, anti-fogging sustainability and hydrophilicity sustainability can be formed, and it is not preferable. To the contrary, if the grain size of metal oxide fine particles exceeds 300 nm, the arithmetic mean roughness (Ra) becomes more than 80 nm and the mean interval (Sm) of dents and projections exceeds 300 nm, wherein the dents and projections are too large, resulting in spoiling the transparency, and since the fine particles are liable to be deposited in the process of production, it is not favorable.

Chain fine particles are preferable as the abovementioned metal oxide fine particles. By using chain fine particles, usually colloid chain fine particles, the shape of the surface dents and projections becomes three-dimensionally cubic and convex and concave, wherein it is possible to form surface dents and projections which have a high anti-fogging capacity, anti-fogging sustainability, and hydrophilicity sustainability respective improved. "Snowtex-OUP" and "Snowtex-UP" which are chain silica sols made by Nissan Chemical Industries, Ltd. may be available as an example of chain colloids. These have a diameter from 10 through 20 nm and a length from 40 through 300 nm.

As a solvent of the abovementioned fine particles, a monocomponent or mixture of water, methanol, ethanol, propanol, etc. is preferable, and water is further preferable.

As hydrolyzable, condensable and polymerizable organometallic compound contained in a coating liquid for forming a dent and projection alkali shut-off film along with the abovementioned metal oxide fine particles, metal alkoxide, for example, methoxide, ethoxide, propoxide, buthoxide, etc. of silicon, aluminium, zirconium, titanium, etc. may be used independently or in combination thereof, and macromolecular type alkyl silicate, for example, "ethylsilicate 40" made by Colcoat, Ltd., and "MS56" made by Mitsubishi Chemical, Ltd. may be also used.

As a hydrolyzed substance of the abovementioned organometallic compound, a alkoxy silane hydrolyzed liquid which is available on the market, for example, "HAS-10" made by Colcoat, Ltd., "Ceramica G-91" and "G-92-6" made by Nippan Lab., Ltd., and "Atron NSI-500" made by Nippon Soda, Ltd. etc. may be used.

A chlorosilyl group based compound containing in a coating liquid for forming a dent and projection alkali shut-off film along with the abovementioned metal oxide fine particles is a compound having at least one chlorosilyl group (—SiCl$_n$X$_{3-n}$, wherein n is 1, 2, or 3, X is hydrogen, or is alkyl group, alkoxy group, or alcyloxy group respectively having the number of carbon from 1 to 10) in a molecule. Of them, a compound having at least two molecules of chlorine is preferable, wherein chlorosilane or its condensed and polymerized substance, in which at least two hydrogens of silane Si$_n$H2$_{n+2}$ (herein n is an integer from 1 to 5) are substituted by chlorine with the other hydrogens substituted by the abovementioned alkyl group, alkoxy group or acyloxy group as necessary, is preferable. For example, tetrachlorosilane (silicon tetrachloride, SiCl$_4$), trichlorosilane (SiCHl$_3$), trichloromonomethylsilane (SiCH$_3$Cl$_3$), dichlorosilane (SiH$_2$Cl$_2$), and Cl—(SiCl$_2$O)n—SiCl$_3$ (wherein n is an integer from 1 to 10), etc. may be listed.

A hydrolyzed substance of the abovementioned chlorosilyl group contained compound may be used independently or in combination thereof. However, most preferably, chlorosilyl group contained compound is tetrachlorosilane. Chlorosilyl group has a very high reactivity and forms a dense film by self condensation or condensation reaction with a substrate surface.

A solvent of solution containing the abovementioned organometallic compound, chlorosilyl group contained compound or their hydrolyzed substances may be fundamentally any type if the abovementioned organometallic compound or chlorosilyl group contained compound or their hydrolyzed substance is substantially dissolved therein. However, alcohol groups such as methanol, ethanol, propanol, buthanol, etc. are most preferable, and the abovementioned organometallic compound, chlorosilyl group contained compound, or their hydrolyzed substance is contained at a concentration ratio from 1 to 30 percent by weight in total.

Water is requisite to hydrolyze the abovementioned organometallic compounds. This may be either acidic or neutral. However, in order to accelerate the hydrolysis, it is preferable that water which is acidified with hydrochloric acid, nitric acid, sulfuric acid, acetic acid, citric acid, sulfonic acid, etc. is used. The quantity of addition of acid is not specially specified. However, it is better that the quantity thereof is 0.001 through 5 (molar ratio) with respect to the quantity of organometallic compounds. If the quantity of addition thereof is less than 0.001 (molar ratio), the promotion of hydrolysis of organometallic compounds is not sufficient, which is not preferable. And if the addition exceeds 5 (molar ratio), no effect of improving the hydrolysis is increased, which is not preferable.

The quantity of addition of water necessary for the hydrolysis of the abovementioned organometallic compound may be 0.1 through 100 (molar ratio) with respect to the quantity of organometallic compounds. If the water addition quantity is less than 0.1 (molar ratio), the promotion of hydrolysis of organometallic compounds is not sufficient, and if the molar ratio exceeds 100, the solution is liable to be unstable. This is not preferable.

In a case where the abovementioned chlorosilyl group contained compound is used, it is not necessarily a requisite that water or acid is added. Even though no water or acid is additionally added, the hydrolysis is carried out with water contained in the solvent or water in the atmosphere. Furthermore, hydrochloric acid is made free in the solution in line with the hydrolysis, wherein the hydrolysis is further promoted. However, there is no problem if water or acid is additionally supplied.

If the content of the abovementioned fine particles in a film is too small, an effect of adding fine particles, that is, an anti-fogging property and anti-fogging sustainability is not sufficient and not preferable. To the contrary, if the content of fine particles is too large, the matrix phase of metal oxides resulting from organometallic compounds or chlorosilyl group contained compounds is made non-continuous to cause the dents and projections of film to be weakened, wherein the film is liable to be made weak, and further the anti-fogging property and anti-fogging sustainability obtained are saturated to cause no further practical improvement to occur. Therefore, it is preferable that the content of fine particles is 5 or more percent by weight and 80 or less percent by weight when converted to the metal oxides. It is further preferable that the content is 10 or more percent by weight and 70 or less percent by weight and still further preferable that the content thereof is 20 or more percent by weight and 60 or less percent by weight.

The abovementioned metal oxide fine particles are mixed with the abovementioned organometallic compound, chlorosilyl group contained compound or their hydrolyzed substance along with a solvent. As necessary, water, acid catalyst and dispersion assisting agent is added thereto, and a coating liquid to form dents and projections on a substrate is adjusted. At this time, organometallic compound and chlorosilyl group contained compound may be used independently or may be used as a mixture thereof.

The abovementioned organometallic compound or chlorosilyl group contained compound is dissolved in a solvent, to which a catalyst and water are added, and hydrolysis is carried out for five minutes to two days at an appointed degree of temperature from 10° C. to the boiling point of the solution, wherein metal oxide fine particles are added to the solution along with a dispersion assisting agent as necessary. In this condition, if necessary, the solution is further hydrolyzed for five minutes to two days at an appointed degree of temperature from 10° C. to the boiling point thereof, whereby a coating liquid for forming a dent and projection alkali shut-off film can be obtained. Furthermore, in a case where a chlorosilyl group contained compound is used, it is not necessary that a catalyst and water are added thereto. Still furthermore, metal oxide fine particles may be added before the abovementioned hydrolysis process is started. Furthermore, in order to omit the hydrolysis process of organometallic compounds, a solution in which organometallic compounds are hydrolyzed, which is available on the market, may be used. Thereafter, the obtained coating liquid may be diluted by a suitable solvent in compliance with the coating method.

The grain size, grain profile of metal oxide fine particles in the abovementioned coating liquid, or blending ratio of organometallic compound or chlorosilyl group contained compound or their hydrolyzed substances and metal oxide fine particles, and solid concentration, etc. adjusted so that the surface roughness of the dent and projection alkali shut-off film has an appointed arithmetical mean roughness (Ra) and mean interval (Sm) of dents and projections.

Next, as regards a dent and projection alkali shut-off film by a liquid-phase deposition method, a dent and projection alkali shut-off silicon oxide film is formed, for example, by silicon oxide being deposited onto the surface of a substrate from the abovementioned water solution by immersing a silicate glass substrate in a silica supersaturation solution of silicofluoride hydroxide having a concentration from 1 to 4 mol/L for 1 to 4 hours at a temperature of 25° C. to 50° C., and simultaneously by silica fine particles dispersed and existing in the abovementioned water solution being adhered to the surface of the substrate. Water solution of the abovementioned silica supersaturation silicofluoride hydroxide can be obtained by being dissolved in a silicofluoride hydroxide water solution having a concentration from 1 to 4 mol/L and further adding boric acid thereto so that its concentration is $1 \times 10^{-4}$ to $100 \times 10^{-4}$ mol/L.

[Denting and projecting photocatalytic films themselves]

As a method for forming dents and projections on a surface by directly denting and projecting titanium oxide based photocatalytic films themselves without denting and projecting the surface of alkali shut-off film, (a) method of etching by using plasma and fluoric acid, etc. after a titanium oxide based photocatalytic film is formed, (b) for example, in a case where a titanium oxide based photocatalytic film is formed by a sol-gel method, a method for adding organic macromolecules or macromolecular fine particles of polyethylene glycol, polystyrene, etc. to or dispersing the same into a coating liquid, (c) for example, in a case where a titanium oxide based photocatalytic film is formed by a sol-gel method, a method for preferably adding and dispersing colloid-like metal oxide fine particles (for example, titanium oxide fine particles, silicon oxide fine particles, aluminium oxide fine particles, zirconium oxide fine particles, cerium oxide fine particles) into a coating liquid main composed of titanium alkoxide, (d) for example, in a case where a titanium oxide based photocatalytic film is formed by a sol-gel method, a method for preferably adding and dispersing colloid-like metal oxide fine particles containing at least titanium oxide fine particles into a coating liquid main composed of metalix alkoxide (for example, silicon alkoxide, zirconium alkoxide, aluminium alkoxide) other than titanium, and (e) for example, in a case where a titanium oxide film is formed by a sol-gel method, a method for producing a large grains by condensing and polymerizing titanium alkoxide by adding alkali, increasing the amount of water addition, or reducing a stabilizer agent, etc. when producing a coating liquid containing titanium alkoxide or its hydrolyzed substance may be listed.

Of these methods, method (a) is not preferable because the number of processes is increased, and method (d) is not preferable since there is a case where the film quality of titanium oxide film is lowered to cause the mechanical strength to be lowered, the transparency to be spoiled, and the photocatalytic activity to be lowered. Methods (b), (c) and (d) are preferably used, by which a dent and projection titanium oxide film can be comparatively easily obtained. It is preferable that the size of fine particles used in the abovementioned methods (b), (c) and (d) is from 4 to 300 nm by the similar reason in a case of the abovementioned dent and projection alkali shut-off film. Furthermore, the abovementioned chain fine particles are preferable as metal oxide fine particles.

According to the abovementioned method (d), 1) a dent and projection thin film where titanium oxide fine particles are dispersed in the matrix composed of metal oxide fine particles other than titanium oxide, and 2) a dent and projection thin film where titanium oxide fine particles and other metal oxide fine particles are dispersed in the matrix composed of metal oxide fine particles other than titanium oxide, can be respectively obtained.

[Layer for preventing organic substances from being adhered]

It is preferable that a layer for preventing organic substances from being adhered as described below is formed on the abovementioned photocatalytic dent and projection film.

A photocatalytic film such as a titanium oxide film having a high activity has a small contact angle which is 5 degrees or less, just after being irradiated by ultraviolet rays, and has a considerably good anti-fogging property at initial stage. However, since organic substances are easily adhered to the surface thereof, the anti-fogging property may be deteriorated chronologically due to an increase of adsorbed organic substances. In the invention, it is preferable that a $SiO_x$ monocomponent equivalent layer (x is 1 or 2) is formed, whereby adsorption of organic substances can be effectively suppressed while maintaining a high photocatalytic activity, and the anti-fogging property can be prevented from being deteriorated.

An $SiO_x$ monocomponent equivalent layer, which is a layer for preventing organic substances from being adhered, can be preferably formed through decomposition by being irradiating with ultraviolet light or being heated under a presence of oxygen after steam of silicon oxide compounds such as 1,3,5,7-tetramethylcychlotetrasiloxane is chemically adsorbed onto the surface of the photocatalytic film, and organic silicon oxide compounds, for example, liquid containing tetraalkoxysilane is coated onto the surface of the photocatalytic film. In addition thereto, an $SiO_x$ monocomponent equivalent layer may be directly formed by a vacuum deposition method, an LB method, or a liquid-phase deposition method, etc. Instead of $SiO_x$ monocomponent equivalent layer, a stain preventing property can be remarkably increased by covering the photocatalytic film surface with an organometallic compound or its hydrolyzed substance containing in molecule at least a function group selected from a group consisting of polyalkylene oxide group, alkyl group, alkenyl group and aryl group. These organometallic compound is gradually decomposed by external factors such as irradiation of ultraviolet light and temperature rise and finally forms a metal oxide monocomponent equivalent layer such as $SiO_x$, etc., and the stain preventing property can be maintained. Here, a monocomponent equivalent layer is substantially a monocomponent layer which indicates a layer of molecules in which 0.5 to 5 molecules are disposed in average in the direction of thickness.

Polyethylene oxide group, polypropyrene oxide group, etc. may be mainly used as polyalkylene oxide group contained in molecules of the abovementioned organometallic compound. As the abovementioned alkyl group, a chain alkyl group having a carbon atom number from 1 to 10 such as methyl group, ethyl group, propyl group, butyl group, pentyl group, hexyl group, octyl group, nonyl group, decyl group, etc., and ring alkyl group having a carbon atom number from 3 to 10 such as cyclopentyl group, cyclohexyl group, etc. may be mainly used. As the abovementioned alkenyl group, a group having a carbon atom number from 1 to 10 such as vinyl group, allyl group, butenyl group, propenyl group, hexenyl group, octenyl group, cyclohexenyl group, etc. is mainly used. Phenyl group, tolyl group, xylyl group, etc. may be mainly used as the abovementioned aryl group.

As these functional groups, for example, organometallic compound containing polyethylene oxide group in molecules, organosilane such as [alkoxy(polyethyleneoxy)alkyl]trialkoxysilane, [alkoxy(polyethyleneoxy)alkyl]trichloro-silane, and a organic titanium compound such as [alkoxy(polyethyleneoxy)alkyl]trialkoxy titanium may be listed.

Since these functional groups are nonpolar or has low polarity, stains are less adhered to cause an increase of the contact angle to be suppressed with respect to water drops, that is, it is preferable since the anti-fogging sustainability and hydrophilicity sustainability is improved. In particular, as regards the abovementioned anti-fogging and stain-prevented articles which are produced by using organosilane including polyalkylene oxide group, the anti-fogging property is excellent, the anti-fogging sustainability and hydrophilicity sustainability (that is, stain preventing property) is specially excellent, and especially, as described above, if the hydrophilicity sustainability is high, the stain preventing property is good.

Since the abovementioned functional group is non-reactive or has low reaction property, no chemical combination with stains is produced to cause stains not to be fixed on the surface. Therefore, since stains adhered onto the surface can be simply eliminated by wiping, etc., the anti-fogging property can be simply revived even though the anti-fogging property goes away due to stains.

It is preferable that organosilane containing the abovementioned polyalkylene oxide group is alkoxysialne and chlorosilane having an alkoxyl group and chloro group in molecules. Since alkoxyl group and chloro group are easily hydrolyzed to cause organosilane to be toughly chemically bonded to the dent and projection surface of photocatalytic film, products having a higher anti-fogging sustainability can be obtained. Of the abovementioned organosilane, alkoxysilane having a polyethylene oxide group, especially, [alkoxy (polyethyleneoxy) alkyl]trialkoxysilane, for example, [methoxy (polyethyleneoxy)propyl] trimethoxysilane is most preferable.

As a method for bonding or adhering the abovementioned organosilane or its hydrolyzed substance to the dent and projection surface of the abovementioned photocatalytic film, any method by which the abovementioned organosilane or its hydrolyzed substance comes into contact with the abovementioned dent and projection surface may be available. For example, a method for coating a liquid containing the abovementioned organosilane or its hydrolyzed substance onto the dent and projection surface (that is, coating method), a method for immersing a photocatalytic dent and projection film formed substance into a liquid containing the abovementioned organosilane or its hydrolyzed substance (that is, a liquid phase chemical adsorption method), a method for placing a photocatalytic dent and projection film formed substance in steam of the abovementioned organosilane or its hydrolyzed substance and adsorbing the same there on (that is, gas phase chemical adsorption method) may be listed.

Of the abovementioned methods, the abovementioned coating method is specially preferable since it is simplest and low in production cost. The abovementioned coating method may use an already known technique, and it is not specially limited. There are many methods which are a method of using a device such as a spin coater, roll coater, spray coater, curtain coater, etc., an immersing method (dip coating method), a flow-coating method, a method for rubbing the photocatalytic dent and projection film surface with a cloth or paper impregnated with a coating liquid in a state where the cloth or paper is brought into contact with the surface (rubbing method), and various kinds of printing methods such as a screen printing, gravure printing, curved printing, etc.

A solvent for dissolving the abovementioned organosilane is not specially limited. However, preferably, water, alcohol, ketone, etc. may be employed along or by combination thereof in view of safety, cost, and operation efficiency. Methanol, ethanol, propanol, butanol, etc. may be listed as alcohol, etc. Acetone, methylethyl ketone, diethyl ketone, etc. may be employed as ketone, etc.

The abovementioned organosilane may be hydrolyzed for use as necessary. Water and acid catalyst may be added to organosilane solution as necessary, wherein hydrolysis is carried out for a fixed period of time at a fixed temperature, and organosilane is diluted for use as necessary.

Although the conditions of hydrolysis of organosilane are not specially limited, it is preferable that the hydrolysis is carried out for three minutes to fifty hours in an range of temperature from 20° C. to 60° C. In a case where the temperature is lower than 20° C. or the time is less than 3 minutes, the promotion of hydrolysis is not sufficient. To the contrary, if the temperature is higher than 60° C. and the time exceeds 50 hours, the effect of promotion of hydrolysis can not be enhanced, the service life of the coating liquid is shortened. Therefore, that is not preferable.

As the abovementioned acid catalyst, mineral acids such as hydrochloric acid, sulfuric acid, nitric acid, etc., and organic acids such as acetic acid, formate acid, citric acid, para-toluenesulfonic acid, etc. may be used. The quantity of addition of acid is not specially limited. However, it is good that the quantity of addition of acid is from 0.0001 to 5 (molar ratio) with respect to organosilane. If the quantity of addition of acid is less than 0.0001 (molar ratio), promotion of hydrolysis of organosilane is not sufficient, and if the same exceeds 5 (molar ratio), the effect of hydrolysis promotion is no more improved. The acid becomes excessive to be unfavorable.

Though the quantity of water added for the abovementioned hydrolysis is not specially limited, it is good that the quantity is 0.1 or more (molar ratio) with respect to organosilane. If the quantity is less than 0.1 (molar ratio), promotion of the hydrolysis of organosilane is not sufficient to be unfavorable.

On the other hand, as regards polyalkylene oxide group contained organosilane having a great hydrolysis speed like, for example, [alkoxy(polyethyleneoxy)alkyl]trichlorosilane, there may be a case where the hydrolysis can be promoted with only water adsorbed by the dent and projection film surface of light catalyst, and it is fixed on the surface by a dehydration/condensation reaction. In this case, since an anti-fogging article which is superior in view of weathertightness, anti-fogging and stain preventing property, anti-fogging sustainability and hydrophilicity sustainability, can be obtained, it is preferable that a coating liquid is prepared by using an nonacqueous solvent with the dissolved water sufficiently decreased. As an nonacqueous solvent, n-hexane, cyclohexane, xylene, toluene, etc. may be listed.

Furthermore, the concentration of organosilane solution used for coating is not specially limited, organosilane of 0.001 through 5 percent by weight is preferably used. If the concentration is lower than 0.001 percent by weight, no sufficient promotion of anti-fogging sustainability and hydrophilicity sustainability of an anti-fogging and stain-prevented article obtained can be recognized, and if the concentration exceeds 5 percent by weight, the anti-fogging property and stain preventing property are not improved anymore. Therefore, that is not economical and is not preferable.

It is preferable that the dent and projection film of photocatalyst on which organosilane solution is coated is dried or heat-treated at a temperature from 20 through 180° C. for three minutes to three hours. By this treatment, bonding of organosilane onto the dent and projection film surface of photocatalyst is strengthened to cause the durability, anti-fogging sustainability and hydrophilicity sustainability of an anti-fogging and stain-prevented article to be improved. If the temperature is less than 20° C. or the treatment time is shorter than three minutes, the abovementioned effect is not sufficient to be unfavorable. Since there is a case where organosilane is decomposed if the temperature is higher than 180° C. That is also unfavorable. Furthermore, even though the treatment time exceeds three hours, no more effect can be expected. Therefore, that is also unfavorable in view of the productivity.

If organosilane forms a monocomponent equivalent layer on the abovementioned dent and projection film surface of the photocatalyst, the anti-fogging sustainability and stain preventing property can be improved. The organosilane layer is gradually decomposed by external factors such as irradiation of ultraviolet rays, temperature rises, etc., and finally becomes a monocomponent equivalent layer of $SiO_x$, wherein the anti-fogging sustainability and stain preventing property are maintained. Even in a case where the thickness of organosilane layer is comparatively large, it is necessary that the thickness of organosilane layer is not greatly fluctuated on places, and it is preferable that dents and projections which are similar to those of the abovementioned dent and projection film of photocatalyst surface, that is, dents and projections having an arithmetical mean roughness (Ra) from 1.5 to 80 nm and an average interval (Sm) of the dents and projections from 4 to 300 nm, are formed on the outside surface of the organosilane layer. Furthermore, preferable dents and projections are such that their arithmetical mean roughness (Ra) is 5 to 30 nm and the mean interval (Sm) of dents and projections is 5 to 150 nm.

The above describes a case of an anti-fogging and stain-prevented article having dents and projections, which have an arithmetical mean roughness (Ra) from 1.5 to 80 nm and a mean interval (Sm) from 4 to 300 nm, formed on the surface of titanium oxide based photocatalytic film. However, instead of such a titanium oxide based photocatalytic dent and projection film, by covering an organic substance adhesion preventing layer made of a silicon oxide layer or a layer of organosilane or its hydrolyzed substance containing at least one functional group selected from a group consisting of polyalkylene oxide group, alkyl group, alkenyl group and aryl group, on a titanium oxide based photocatalytic film not having any surface dent and projection, it is possible for organic substances to be prevented from being adhered onto the titanium oxide based photocatalytic film surface, and it is possible to suppress a deterioration of hydrophilicity due to an increase of adsorbed organic substances, whereby an excellent stain preventing property can be maintained. The description of this organic substance adhesion preventing layer is omitted because the abovementioned organic substance adhesion preventing layer employed for titanium oxide based photocatalytic dent and projection film can be used as it is.

BEST MODE FOR CARRYING OUT THE INVENTION

Hereinafter, a description is given of the invention on the basis of preferred embodiments. However, the invention is not limited to such embodiments.

[Embodiment 1 Comparison Example 1]

Soda lime silicate glass plate (containing $Na_2O$ about 13% and $K_2O$ about 0.8%) 10 cm square and another soda lime silicate glass plate having a dent and projection silicon oxide ($SiO_2$) film coated thereon to be about 45 nm thick by a liquid-phase film forming method were prepared as substrates. A dent and projection silica film was coated as shown below. 3.9 mol/L silicofluoride hydroxide water solution, 50 mL in which silica-gel was saturated and dissolved was kept on a temperature of 35° C., to which water of 50 mL whose temperature is 35° C. was added to prepare a water solution of silicofluoride hydroxide in which silicon dioxide of 1.95 mol/L was supersaturated. A soda lime silicate glass plate was immersed, for about two hours, in a bath of the water solution whose temperature is kept on 35° C. Thereafter, the same was taken out from the bath. After the glass plate was washed in water and dried, the same was baked for one hour at 200° C. According to the result of analysis by an electron microscope, it was confirmed that a silica film having a thickness of about 45 nm was formed on the glass plate. On the basis of the result of measurement by an atomic force microscope, the surface of the silica film became a dent and projection surface where its arithmetical mean roughness (Ra) is 2.0 nm and the mean interval (Sm) of dents and projections is 5 nm. However, the surface of a non-treated glass plate was a smooth surface where the arithmetical mean roughness (Ra) is less than 0.2 nm and the mean interval (Sm) of dents and projections is 400 nm. In compliance with the results of chemical analysis, it was confirmed that the abovementioned silica film contains fluorine atoms of about 7 percent by weight.

Next, a description is given of a coating method of titanium oxide thin film by using a dipping (sol-gel) method. Acethyl acetone of 60.3 g (0.6 mol) was gradually dropped into titanium tetraisopropoxide ($Ti(OiPr)_4$) of 85.6 g (0.3 mol) by using a buret while agitating the same. The agitation was continued for about one hour, thereby causing a stable $Ti(AcAc)_2(OiPr)_2$ complex solution (mother solution) to be obtained. The mother solution was diluted 3.3 times by using ethanol to make a coating solution. After soda lime silicate glass substrate and soda lime silicate glass plate with the abovementioned dent and projection silica film were immersed in the coating liquid, a film was formed by drawing up at a drawing rate of 4.6 cm/m, and they were baked at 500° C. for thirty minutes.

The obtained samples was named sample A (glass substrate/titanium oxide film) and sample B (glass substrate/dent and projection silicon oxide film/fluorine atom doped titanium oxide film). On the basis of the result of analysis of X-ray diffraction, it was confirmed that titanium oxide film of sample B was of anatase type crystals while titanium oxide film of sample A was not crystallized. Furthermore, it was confirmed by Rutherford backscattering spectrography that fluorine was doped in the titanium oxide film of sample B at a ratio of 0.1 percent by weight, which was presumed to be diffused from the dent and projection silicon oxide film. And the thickness of the titanium oxide thin films of samples A and B were about 50 nm. According to the result of measurement by an atomic force microscope, although the surface of titanium oxide film of sample B became a dent and projection surface where the arithmetical mean roughness (Ra) is 2.0 nm and the mean interval (Sm) of dents and projections is 5 nm, the surface of titanium oxide film of sample A became a smooth surface where the arithmetical mean roughness (Ra) was less than 0.2 nm and the mean interval (Sm) of dents and projections is 400 nm.

By using the method described below, an $SiO_x$ monocomponent layer film was formed on the surface of titanium oxide films of samples A and B. After samples A and B were set in a vacuum desiccator which was kept on a temperature of 80° C., 1,3,5,7-tetramethylcychlo-tetracychlosan (TMCTS) of 200 μL was poured thereinto by using an injector. In this state, they were retained for thirty minutes as it they. After that, the temperature was increased to 100° C., wherein TMCTS which was not reacted was eliminated by heating the same for thirty minutes while vacuuming the desiccator. By this method, a monocomponent film of TMCTS was formed on the titanium oxide film. Furthermore, by using a 500 W high-voltage mercury lamp, light was irradiated on the titanium oxide film at a distance of 8cm for one hour, wherein the TMCTS film was oxidized to convert the same to an $SiO_x$ monocomponent equivalent film. Thus, sample A' (glass substrate/titanium oxide film/ $SiO_x$ monocomponent equivalent film, comparison example 1) and sample B' (glass substrate/dent and projection silicon oxide film/fluorine atom doped titanium oxide film/$SiO_x$ monocomponent equivalent film, embodiment 1) were obtained.

These samples A' and B' were caused to remain, as they are, in a room where people constantly enters and goes out, without being irradiated by any ultraviolet rays, and the degree to which the anti-fogging property is lowered by the surface being stained, was evaluated by a fog degree when air is breathed thereon (Breathing test). That is, although the samples are not fogged even though air is breathed thereon immediately after the surface is made clean, stain constituents in the atmospheric air are adsorbed on the sample surface by the samples being caused to remain indoors as they are, and the surface becomes fogged by the breathing test. The time (anti-fogging time) from the moment when they are caused to remain indoors to the commencement of foggring was made an index of the anti-fogging sustainability. It can be said that the greater the index is, the higher the anti-fogging sustainability is. Furthermore, the samples, on which fog was generated in the breathing test due to being left indoors over as they are, were continuously irradiated again by ultraviolet rays (360 to 370 nm) having an intensity of 0.8 mW/cm$^2$, wherein the time required for irradiating ultraviolet rays (anti-fogging property recovery time) until no fog is produced in the breathing test was made an index of recovering the anti-fogging property recovery. Furthermore, the irradiation intensity of ultraviolet rays (360 to 370 nm) of 0.8 mW/cm$^2$ is equivalent to two to five times the irradiation intensity of ultraviolet rays (360 to 370 nm) from the sun light on the ground, outdoors, at noon, in lat. 35°N, in a cloudy day in the winter time. It can be said the smaller the anti-fogging recovering time is, the higher the anti-fogging property recovery is. The anti-fogging sustainability of 24 hours or more and the anti-fogging property recovery of two hours or less are required in various applications. Furthermore, generally, if the figure obtained by dividing the anti-fogging sustainability time (hours) by the anti-fogging recovering time (hours), that is;

[Fog fogging sustainability time]/[anti-fogging recovering time]is 40 or more, those substances can be preferably utilized as an anti-fogging glass article.

Furthermore, the stain prevention sustainability test was carried out by the following outdoor exposure test.

A test glass plate is vertically installed outdoors in the city of Itami, Hyogo Prefecture, and an exposure test was carried out for six months in an environment simulated to be a vertical plane below the eaves where rain water flows on and drops on the test glass plate. After the test, the stained or contaminated state of the glass plate is evaluated by a visual evaluation on the basis of Table 1 below.

TABLE 1

| Evaluation | Stained or contaminated state |
|---|---|
| ⊙ | Almost no stain is noticeable. |
| ○ | Slightly stained, and wrinkle-like stains thinly appeared. |
| Δ | Stained, and wrinkle-like stains are noticeable. |
| X | Stain is remarkable, and wrinkle-like stains are remarkably noticeable. |

The results of various kinds of evaluation of samples A' and B' are shown in Table 2. Sample A' (Comparison example 1) has a good anti-fogging and stain preventing sustainability, but its anti-fogging property recovery is lower. To the contrary, it is clear that sample B' (Embodiment 1) has a good anti-fogging sustainability and simultaneously the anti-fogging property recovery has been remarkably improved.

Furthermore, it is also clear that sample B' (embodiment 1) has a good stain preventing property while sample A' (comparison example 1) has a low stain preventing property.

[Embodiment 2]

Hydrolyzed, condensed and polymerized solution of ethylsilicate (Brand name: HAS-10, Colcoat, Limited), 11.8 parts by weight, chain silicon oxide colloid having a diameter from 10 to 20 nm and a length of 40 to 300 nm (Brand name: Snowtex OUP, Nissan Chemical Industries, Ltd. Solid content 15 percent by weight), 13.3 parts by weight, and 2-propanol, 74.9 parts by weight, were blended at a room temperature and they were diluted with 2-propnol three times by weight and agitated by at a room temperature for two hours, thereby causing a coating liquid for forming a dent and projection silica film to be obtained. A soda lime silicate glass substrate 10 cm square was immersed in the abovementioned coating liquid for forming dents and projections and was taken up at a rate of 20 cm per minute for coating. This glass substrate was dried at 100° C. for thirty minutes and further dried at 250° C. for thirty minutes. Thereafter, by treating the same in an oven of 500° C. for one hour, a glass substrate was obtained, in which silicon oxide dents and projections film having a thickness of 100 nm.

As regards the glass plate on which the abovementioned silicon oxide dent and projection film was formed, the arithmetical mean roughness (Ra) and mean interval (Sm) of dents and projections were obtained by using an atomic force microscope (for example, Seiko Electronic Co., Ltd., Type SPI3700), wherein Ra was 7 nm and Sm was 20 nm.

Next, a description is given of a method for making a fluorine atom doped titanium oxide film. Acetyl acetone of 248 ml (2.4 mol) was gradually dropped into titanium tetraisopropoxide (Ti(OiPr)$_4$) of 353 mL (1.2 mol) by using a buret while agitating the same. The agitation was continued for about one hour, thereby causing a stable Ti(AcAc)$_2$(OiPr)$_2$ complex solution (mother solution) to be obtained. On the other hand, a solution was prepared, in which trifluoroacetate (TFA) 0.75 g was dissolved in ethanol anhydride of 1398 mL. After the abovementioned mother solution was added to this solution, a coating solution for uniform fluorine atom doped titanium film was obtained by sufficiently agitating the abovementioned solution. After the abovementioned dent and projection silicon oxide film coated soda lime silicate glass substrate was immersed in the coating liquid for fluorine atom doped titanium oxide film and was lifted up at a rate 32 mm per minute, the glass substrate was dried at a room temperature for thirty minutes and further baked at 500° C. for thirty minutes, whereby anatase type titanium oxide film about 60 nm thick, on which fluorine atoms are doped about 0.38 percent by weight, was obtained. On the surface of titanium oxide film, the arithmetical mean roughness (Ra) was 7 nm, and the mean interval (Sm) of dents and projections was 20 nm.

An $SiO_x$ monocomponent equivalent film was formed on the abovementioned surface of titanium oxide film by the same method as that of Embodiment 1. A sample thus obtained is made C (glass substrate/dent and projection silicon oxide film/fluorine atom doped titanium oxide film/ $SiO_x$ monocomponent equivalent film).

The results of various kinds of anti-fogging and stain preventing performance of sample C are shown in Table 2. Sample C has a remarkably improved anti-fogging property recovery in comparison with sample A' (Comparison example 1) and simultaneously has a good anti-fogging sustainability and an excellent stain preventing property.

[Embodiment 3]

Tetramethoxysilane, 50 parts by weight, 2-propanol, 300 parts by weight, 1N nitric acid, 2.5 parts by weight, and water, 30 parts by weight, were added to each other, and they were agitated at 50° C. for two hours. The solution was agitated and cured at 300° C. for one day, thereby causing an alkali shut-off film sol liquid to be obtained.

Soda lime silicate glass plate (65 mm×150 mm×3 mm) having its surface polished by a cerium oxide oriented polishing agent, which is washed, further ultrasonically cleaned in pure water and dried, was immersed in the abovementioned alkali shut-off film sol liquid and was lifted up at a rate of 30 cm per minute to cause sol to be coated. Thereafter, the glass plate was dried at a room temperature for several minutes and further treated at 500° C. for three hours, thereby causing a glass plate to be obtained, in which a flat silicon oxide thin film about 250 nm thick was formed.

Next, a description is given of a method for making a fluorine atom doped titanium oxide film having dents and projections on its surface.

Ethanol anhydride 300 mL was divided into two equal parts, each containing 150 mL. Titanium tetraisoproxide of 42.6 g and diethanolamine of 15.9 g were added to one of them, and they were sufficiently agitated. Trifluoro acetate (TFA) of 0.23 g was added to the other of them and is agitated. After two solutions were mixed and agitated, water of 2.7 g and polyethylene glycol of 3 g (molecular weight= 2000) were added thereto and agitated until a completely uniform solution was obtained, thereby causing a coating solution to be obtained. After the abovementioned flat silicon oxide film coated glass plate was immersed in the coating liquid, the same was lifted up at a rate of 4.6 cm per minute, wherein the glass plate was coated with the coating liquid, and was dried at a room temperature. Furthermore, by baking the same glass plate at 550° C. for one hour, an anatase type titanium oxide dent and projection film, 70 nm thick, on which fluorine atoms are doped about 0.9 percent by weight, was obtained.

The dents and projections on the surface of the anatase type titanium oxide film were formed by polyethyleneglycol being eliminated from the film when the same was baked at a temperature of 550° C., wherein the arithmetical mean roughness (Ra) was 35 nm, and the mean interval (Sm) of dents and projections was 110 nm. Furthermore, an $SiO_x$ monocomponent equivalent film was formed by the same method as that described for Embodiment 2. A sample thus obtained was made D (Glass substrate/silicon oxide film/ fluorine atom doped dent and projection titanium oxide film/$SiO_x$ monocomponent equivalent film). The results of various kinds of anti-fogging and stain preventing performance of sample D are shown in Table 2, wherein it is clear that sample D has an excellent anti-fogging and stain preventing performance.

[Embodiment 4]

Soda lime silicate glass, 10 cm square, on which a dent and projection silicon oxide film about 100 nm thick was coated by a sol-gel method, was prepared as a substrate. The coating method of dent and projection silicon oxide film is the same as that described for Embodiment 2.

Ethanol 75 parts by weight, 2-propanol 75 parts by weight, acethyl acetone 5 parts by weight, titanium tetraisopropoxide 1.3 parts by weight, and 6N nitric acid 0.3 parts by weight were blended and agitated at a room temperature for three hours, thereby causing a titanium oxide coating liquid to be obtained. The abovementioned dent and projection silicon oxide film formed glass plate was immersed in the coating liquid and was lifted up at a rate of 20 cm per minute, wherein the same was dried at 100° C. for thirty minutes and further dried at 250° C. for thirty minutes. Thereafter, the glass plate was baked in a 500° C. oven for one hour in order to make sample E (glass substrate/dent and projection silicon oxide film/titanium oxide film) where an anatase type titanium oxide film about 15 nm thick was formed on the dent and projection silicon oxide film. The surface roughness was secured by the abovementioned atomic force microscope, wherein Ra was 7 nm and Sm was 20 nm. It was found that no chang was produced in comparison with a state before a titanium oxide film was formed.

The results of evaluation of various kinds of anti-fogging and stain preventing performance of sample E are shown in Table 2, wherein it is found that the anti-fogging property and stain preventing property of sample E are excellent.

[Embodiment 5]

0.1N acetic acid 1 mL was added to a liter of ethanol. Two grams of [methoxy (polyethyleneoxy)Propyl] trimethoxysilane (Chisso Co., Ltd., [SIM6492.7], content ratio: 90%, molecular weight, 460 to 590, ethylene oxide unit, 6 to 9) were added to a liquid of 798 grams, mainly composed of this ethanol, and they were agitated at 30° C. for one hour to prepare a coating liquid.

Sample E according to Embodiment 4 was immersed in the abovementioned coating liquid and was lifted up at a rate of 5 cm per minute. Thereby, sample E was coated with the coating liquid. The coated sample E was dried at 120° C. for thirty minutes, heat-treated and cooled down to a room temperature. Thereafter, sample E was lightly washed in pure water, wherein an organosilane layer (about 4 nm thick) containing polyethylene oxide group in its molecules was formed. This sample was made sample F (glass substrate/ dent and projection silicon oxide film/titanium oxide film/ polyethylene oxide group contained silane film). Furthermore, the arithmetical mean roughness (Ra) of the surface of the polyethylene oxide group contained silane film was 7 nm, and the mean interval Sm of dents and projections was 20 nm.

The results of evaluation of various kinds of anti-fogging and stain preventing performance of sample F are shown in Table 2. It was made clear that the anti-fogging sustainability of sample F is further improved than that of sample E and its anti-fogging property recovery is good in comparison with the comparison example. It is also clear that sample F has a good stain preventing property.

[Embodiment 6]

Ethyl acetoacetate 1 part by weight was added to zirconium buthoxide 5 parts by weight and they were agitated at 30° C. for two hours (Liquid A). On the other hand, separately, tetraethoxysilane 50 parts by weight, 2-propanol 1000 parts by weight, 1N nitric acid 2.5 parts by weight, and water 50 parts by weight were added to each other and they were agitated at 30° C. for two hours (Liquid B). Liquid A and liquid B were blended and agitated and cured at 50° C. for three hours and at 30° C. for one day, thereby obtaining an alkali shut-off film sol liquid.

Soda lime silicate glass plate (65 mm×150 mm×3 mm) having its surface polished by a cerium oxide oriented polishing agent, which is washed, further ultrasonically cleaned in pure water and dried, was immersed in the abovementioned alkali shut-off film sol liquid and was lifted up at a rate of 10 cm per minute to cause sol to be coated. Thereafter, the glass plate was dried at a room temperature for several minutes and further treated at 500° C. for three hours. Thereby, a glass plate was obtained, in which a flat silica-zirconia thin film (silica, 92 percent by weight, zirconia 8 percent by weight) about 30 nm thick having no dent and projection.

Fluorine atom doped titanium oxide film and $SiO_x$ monocomponent equivalent film were formed by the same method as that described for Embodiment 2. This sample was made sample G (Glass substrate/flat silica-zirconia film/fluorine atom doped titanium oxide film/$SiO_x$ monocomponent equivalent film). The quantity of doping fluorine atoms in the titanium oxide film was 0.38 percent by weight and the film thickness was about 60 nm. The surface roughness was obtained by the abovementioned atomic force microscope, wherein Ra was less than 0.2 nm and Sm was 420 nm, and the roughness was found to be flat.

The results of evaluation of various kinds of anti-fogging and stain preventing performance of sample G are shown in Table 2. On the basis of the results, it is clear that sample G is excellent anti-fogging and stain preventing glass.

[Embodiment 7]

Soda lime silicate glass plate 65 mm×150 mm×3 mm thick, on which a flat silica film (alkali shut-off film) about 250 mm thick is formed was prepared by the sol-gel method as a substrate. The coating method of flat silica film is the same as that described for Embodiment 3.

Acethyl acetone of 150.8 g (1.5 mol) was gradually dropped, by using a buret, into titanium tetraisoproxide of 85.6 g (0.3 mol) while agitating the same. After they were agitated for about one hour, ethanol 710 g was added thereto. Ethyltriethoxysilane 4 g was added to the liquid as an auxiliary dispersing agent, and titania colloid 80 g having a grain size from 30 to 60 nm (Brand name: Titania Sol CS-N, Ishihara Industries, Ltd., solid contents: 30 percent by weight) was gradually dropped thereto by using a buret, wherein they were agitated for about one hour. Thus, a coating liquid for a dent and projection titanium oxide film was produced.

A glass plate on which the abovementioned flat silica thin film is formed was immersed in the abovementioned coating liquid for a dent and projection titanium oxide film and was lifted up at a rate of 10 cm per minute, wherein by baking the same at 500° C. for three hours, titanium oxide thin film about 100 nm thick, consisting of anatase type crystals, was obtained. The arithmetical mean roughness (Ra) and mean interval (Sm) of dents and projections were obtained by an atomic force microscope with respect to the surface of the titanium oxide thin film, wherein Ra was 10 nm and Sm was 70 nm. The sample thus obtained was made sample H (glass substrate/silica film/dent and projection titanium oxide film). The results of having evaluated the anti-fogging and stain preventing performance by the same method as that described for embodiment 1 are shown in Table 2, wherein it is clear that sample H is excellent anti-fogging and stain preventing glass.

[Embodiment 8]

An $SiO_x$ monocomponent equivalent film was formed on the surface of sample H produced according to Embodiment 7 by the same method as that described for Embodiment 2. The sample thus obtained was made sample I (glass substrate/silica film/dent and projection titanium oxide film/$SiO_x$ monocomponent equivalent film).

The results of having evaluated the anti-fogging and stain preventing performance by the same method as that described for embodiment 1 are shown in Table 2, wherein it is clear that sample I is excellent anti-fogging and stain preventing glass.

[Embodiment 9]

A organosilane layer (about 4 nkm thick) containing a polyethylene oxide group was formed on the surface of sample (glass substrate/flat silica-zirconia film/fluorine atom doped titanium oxide film) before the $SiO_x$ monocomponent equivalent film produced in Embodiment 6 by the same method as that described in Embodiment 5.

Furthermore, by using a 500 W high-voltage mercury lamp, light was irradiated on this sample at a distance of 8 cm for 24 hours in order to oxidize the organosilane layer, and to convert the same to an $SiO_x$ monocomponent equivalent film. This sample was made sample J (glass substrate/flat silica-zirconia film/fluorine atom doped titanium oxide film/$SiO_x$ monocomponent equivalent film). The arithmetical mean roughness (Ra) and mean interval (Sm) of dents and projections were obtained by using an atomic force microscope with respect to the surface of the sample, wherein Ra was less than 0.2 nm and Sm was 430 nm. That is, the sample surface was a flat surface.

The results of having evaluated the anti-fogging and stain preventing performance by the same method as that described for embodiment 1 are shown in Table 2, wherein it is clear that sample J is excellent anti-fogging and stain preventing glass.

[Embodiment 10]

Soda lime silicate glass plate 65 mm×150 mm×3 mm thick, on which a flat silica film (alkali shut-off film) about 80 mm thick is formed was prepared by the sol gel method as a substrate. The coating of flat silica film was carried out by the method described for Embodiment 3, by using a liquid obtained by diluting an alkali shut-off sol described in Embodiment 3 three times by weight with ethanol.

Next, a description is given of a method for making an titanium oxide film. Acethyl acetone (AcAc) of 248 mL (2.4 mol) was gradually dropped into titanium tetraisopropoxide (Ti (OiPr)$_4$) of 353 mL (1.2 mol), by using a buret while agitating, and they were agitated for about one hour, wherein a stable Ti(AcAc)$_2$(OiPr)$_2$ complex solution was obtained by agitating the same for about one hour. Ethanol 1398 mL was added to this solution and they were sufficiently agitated, wherein a coating solution for uniform titanium oxide film was obtained. After the abovementioned soda lime silicate glass substrate on which a flat silica film is coated was immersed in the coating liquid for titanium oxide film and lifted up by a rate of 32 mm per minute and dried at a room temperature for thirty minutes, an anatase type titanium oxide film about 60 nm thick was obtained by baking the same at 500° C. for thirty minute.

Furthermore, An $SiO_x$ monocomponent equivalent film was formed by the same method as that described for Embodiment 2. The sample was made sample K (glass substrate/flat silicate film/flat titanium oxide film/$SiO_x$ mono component equivalent film).

The results of evaluation of various kinds of anti-fogging and stain preventing performance of sample K are shown in Table 2, wherein it is found that the anti-fogging property and stain preventing property of sample K are excellent.

[Embodiment 11]

Soda lime silicate glass, 10 cm square, on which a dent and projection silica film about 100 nm thick was coated by a sol-gel method, was prepared as a substrate. The coating method of dent and projection silica film is the same as that described for Embodiment 2.

A photocatalyst coating liquid ST-K03 (Ishihara Industries, Ltd., content ratio of titanium oxide fine particles, 5 percent by weight, and inorganic binder, 5 percent by weight), which is available in the market, was diluted four times by weight by using ethanol. This liquid was coated to form a film on a glass plate, on which the dent and projection silica film is formed, by using a spin-coating method (1,500 rpm, 10 seconds, liquid quantity, 4 ml), and the glass plate was heat-treated at 500° C. for one hour, thereby causing a photocatalytic thin film about 60 nm thick to be formed. According to the results of chemical analysis, it was confirmed that this photocatalytic thin film is comprised of titanium oxide about 50 percent by weight and silica about 50 percent by weight.

This sample was made sample L (glass substrate/dent and projection silicon oxide film/titanium oxide silica oxide film). As regards the surface of this sample, the arithmetical mean roughness (Ra) and mean interval (Sm) of dents and projections were obtained by using an atomic force microscope, wherein the surface thereof became a dent and projection surface having Ra of 5 nm and Sm of 23 nm.

The results of having evaluated the anti-fogging and stain preventing performance by the same method as that described for embodiment 1 are shown in Table 2, wherein it is clear that sample L is excellent anti-fogging and stain preventing glass.

[Embodiment 12]

Soda lime silicate glass plate 65 mm×150 mm×3 mm thick, on which a flat silica film (alkali shut-off film) about 80 mm thick is formed was prepared by the sol gel method as a substrate. The coating of flat silica film was carried out by the method described for embodiment 10.

Titanium oxide fine particles dispersed liquid having a diameter of about 10 (Brand name: ST-K01, Ishihara Industries, Ltd., solid contents, 10 percent by weight, titanium oxide contents, 8 percent by weight), 2.7 parts by weight, ethanol, 195.3 parts by weight, chain silica colloids having a diameter from 10 to 20 nm and a length from 40 to 300 nm (Brand name: Snowtex OUP, Nissan Chemical Industries, Ltd., solid contents, 15 percent by weight), 1.4 parts by weight, and silicon tetrachloride, which is available in the market, 0.6 parts by weight were agitated at a room temperature for one hour, thereby obtaining a coating liquid for forming a photocatalytic dent and projection film.

The abovementioned glass plate having a flat silicon oxide film formed thereon was perpendicularly suspended in an environment where the temperature was 20° C. and the relative humidity (RH) was 30%, wherein the glass plate was coated with the abovementioned coating liquid for forming a photocatalytic dent and projection film by pouring the same from its top (Flow coating method). This glass plate was dried at 150° C. for thirty minutes and was further heat-treated in a 400° C. oven for two hours, wherein a titanium oxide silica oxide dent and projection film about 60 nm thick was formed.

This sample was made sample M (glass substrate/dent and projection silicon oxide film/titanium oxide silica oxide film). As regards the surface of this sample, the arithmetical mean roughness (Ra) and mean interval (Sm) of dents and projections were obtained by using an atomic force microscope, wherein the surface thereof became a dent and projection surface having Ra of 8 nm and Sm of 23 nm.

The results of having evaluated the anti-fogging and stain preventing performance by the same method as that described for embodiment 1 are shown in Table 2, wherein it is clear that sample M is excellent anti-fogging and stain preventing glass.

[Embodiment 13]

Soda lime silicate glass plate 65 mm×150 mm×3 mm thick, on which a fluorine atom doped flat silica film about 80 mm thick is formed was prepared by the sol gel method as a substrate. The fluorine atom doped flat silica film was formed by the following method.

Tetramethoxysilane 50 parts by weight, ethanol 530 parts by weight, 2-propanol 530 parts by weight, 1N nitric acid 2.5 parts by weight, water 30 parts by weight and trifluoro acetate (TFA) 1.4 g were added to each other and were agitated at 50° C. for two hours. Furthermore, they were agitated and cured at 30° C. for one day. Thereby, an alkali shut-off film sol liquid was obtained.

Soda lime silicate glass plate (100 mm×100 mm×3 mm) having its surface polished by a cerium oxide oriented polishing agent, which is washed, further ultrasonically cleaned in pure water and dried, was immersed in the abovementioned alkali shut-off film sol liquid and was lifted up at a rate of 30 cm per minute to cause sol to be coated thereon. Thereafter, the glass plate was dried at a room temperature for several minutes and further treated at 200° C. for three hours, whereby a glass plate was obtained, on which a fluorine atom doped flat silica film having fluorine doped 3 percent by weight to be about 90 nm thick, was formed.

A photocatalytic film (titanium oxide silicon oxide) about 50 nm thick was formed on a glass plate having the fluorine atom doped flat silicon oxide film formed thereon, by the method described in embodiment 11. It was confirmed by Rutherford backscattering spectrography that fluorine which was presumed to be diffused from the fluorine atom doped flat silicon oxide film was doped in this photocatalyst at a ratio of 0.1 percent by weight. Furthermore, $SiO_x$ monocomponent equivalent layer was formed on this photocatalytic film by the method described in embodiment 2.

This sample was made sample N (glass substrate/flat fluorine atom doped silica film/fluorine atom doped titanium oxide silicon oxide film/$SiO_x$ monocomponent equivalent layer). As regards the surface of sample N, the arithmetical mean roughness (Ra) and mean interval (Sm) of dents and projections was obtained by using an atomic force microscope, wherein Ra was 1.2 nm and Sm was 20 nm.

The results of having evaluated the anti-fogging and stain preventing performance by the same method as that described for embodiment 1 are shown in Table 2, wherein it is clear that sample N is excellent anti-fogging and stain preventing glass.

[Comparison Examples 2, 3]

Soda lime silicate glass plate 10 cm square, which was used in embodiment 1, was made sample N as it is without any treatment, wherein various kinds of anti-fogging and stain preventing performance were evaluated, and the results thereof are shown in Table 2 (Comparison example 2).

A glass substrate having a silica dent and projection film formed thereon, which was obtained in embodiment 2, was made sample P without any treatment thereafter, wherein various kinds of anti-fogging and stain preventing performance were evaluated, and the results thereof are shown in Table 2 (Comparison example 3).

TABLE 2

| Sample | Anti fogging property sustaining time (hours) (a) | Anti fogging property sustaining time (hours) (b) | (a)/(b) | Evaluation of stain preventing state after exposure test |
|---|---|---|---|---|
| Embodiments | | | | |
| 1 | B' | 72 | 0.5 | 144 | ⊚ |
| 2 | C | 200 | 0.25 | 800 | ⊚ |
| 3 | D | 180 | 0.3 | 600 | ⊚ |
| 4 | E | 360 | 1.0 | 360 | ⊚ |
| 5 | F | 1488 | 3.0 | 496 | ⊚ |
| 6 | G | 40 | 0.25 | 160 | ⊚ |
| 7 | H | 120 | 0.7 | 171 | ⊚ |
| 8 | I | 220 | 0.8 | 275 | ⊚ |
| 9 | J | 60 | 0.6 | 100 | ⊚ |
| 10 | K | 50 | 0.8 | 63 | ⊚ |
| 11 | L | 280 | 1.0 | 280 | ⊚ |
| 12 | M | 320 | 1.0 | 320 | ⊚ |
| 13 | N | 48 | 0.3 | 160 | ⊚ |
| Comparison example | | | | |
| 1 | A' | 10 | 5 | 2 | X |
| 2 | N | 20 | 0 | — | X |
| 3 | P | 300 | 0 | — | Δ |

Industrial Unitization

The present invention is suitable to be applicable as an anti-fogging and stain-prevented glass article, in particular as an anti-fogging and stain-prevented glass plate for automobile and buildings and an anti-fogging and stain-prevented glass article for glasses, mirrors, lenses, showcases, etc.

What is claimed is:

1. An anti-fogging and stain prevented glass article having (i) an alkali shut-off film, (ii) a photocatalytic film and (iii) an organic substance adhesion preventing layer composed of a layer of silica laminated in the order on the surface of a glass substrate and having dents and projections formed on the surface of the photocatalytic film, which have an arithmetical mean roughness (Ra) from 1.5 to 80 nm and a mean interval (Sm) of dents and projections from 4 to 300 nm.

2. An anti-fogging and stain-prevented glass article as set forth in claim 1, wherein said organic substance adhesion preventing layer has a mean number of molecules from 0.5 to 5 in its thickness direction.

3. An anti-fogging and stain-prevented glass article as set forth in claim 1, wherein said dents and projections are formed by surface dents and projections of said alkali shut-off film.

4. An anti-fogging and stain-prevented glass article as set forth in claim 1, wherein the dents and projections are formed in the light catalyst film, and the alkali shutoff film is free from surface dents and projections.

5. An anti-fogging and stain-prevented glass article as set forth in claim 1, wherein said photocatalytic film contains titanium oxide at a ratio of 10 or more percent by weight.

6. An anti-fogging and stain-prevented glass article as set forth in claim 5, wherein said photocatalytic film consists of titanium oxide.

7. An anti-fogging and stain-prevented glass article as set forth in claim 5, wherein said photocatalytic film further contains fluorine atoms.

8. An anti-fogging and stain-prevented glass article as set forth in claim 7, wherein said photocatalytic film contains said fluorine atoms at a ratio of 0.002 to 1 percent by weight.

9. An anti-fogging and stain-prevented glass article as set forth in claim 1, wherein said photocatalytic film has a thickness from 10 to 500 nm.

10. An anti-fogging and stain-prevented glass article as set forth in claim 1, wherein said alkali shut-off film consists of at least one kind of metal oxide substrate, which is selected from a group consisting of silicon oxide, aluminium oxide, titanium oxide, zirconium oxide, and cerium oxide.

11. An anti-fogging and stain-prevented glass article as set forth claim 1, wherein said alkali shut-off film is a film mainly composed of silicon oxide.

12. An anti-fogging and stain-prevented glass article as set forth in claim 1, wherein said alkali shut-off film has a thickness from 10 to 300 nm.

13. An anti-fogging and stain-prevented glass article as set forth in claim 1, wherein said alkali shut-off film contains fluorine atoms.

14. An anti-fogging and stain-prevented glass article as set forth in claim 13, wherein said alkali shut-off film has fluorine at a ratio from 0.002 to 10 percent by weight.

* * * * *